INVENTORS
ARTHUR G. BAROWS
EDWARD W. PARRISH
ROBERT C. MINER

ATTY

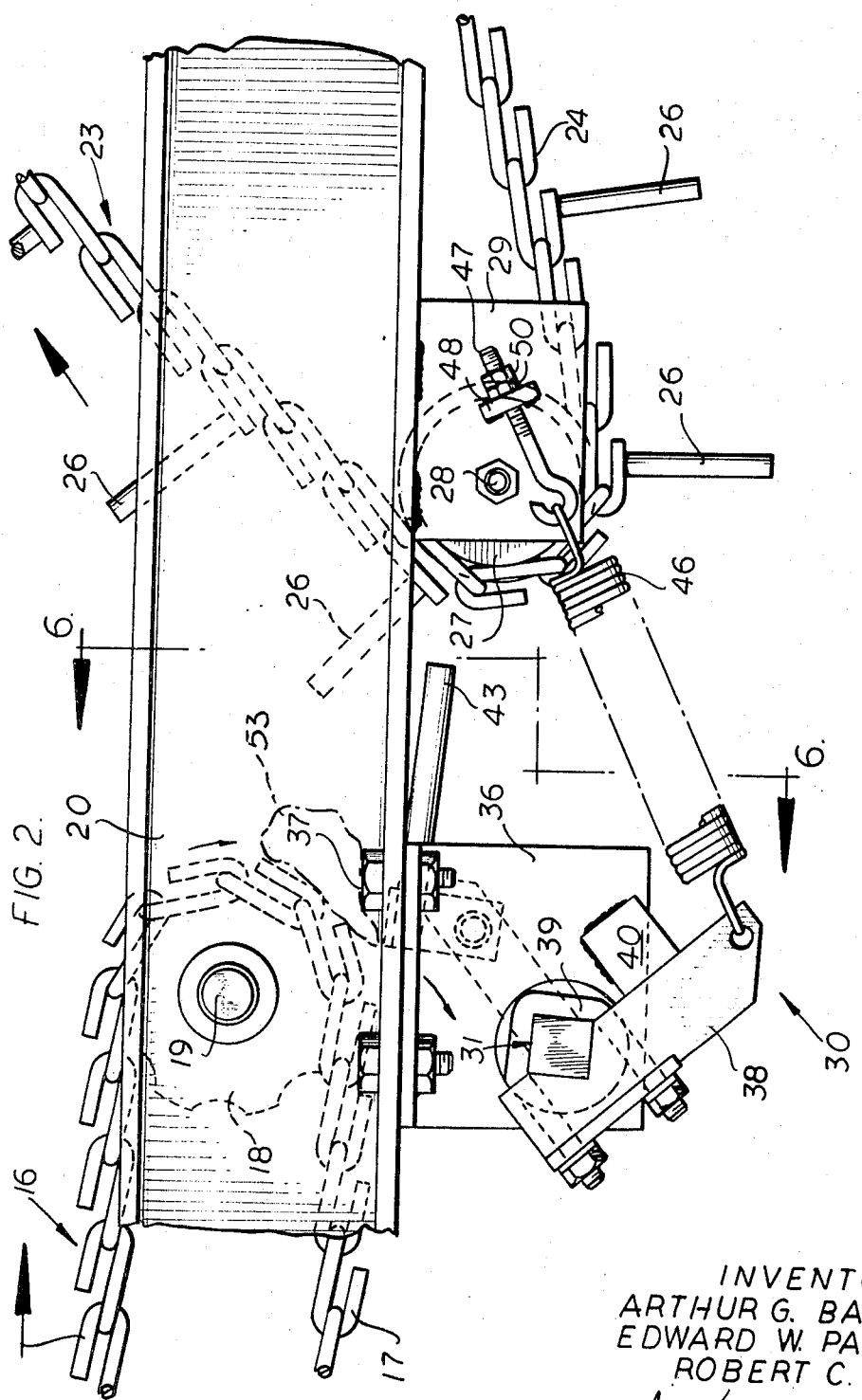

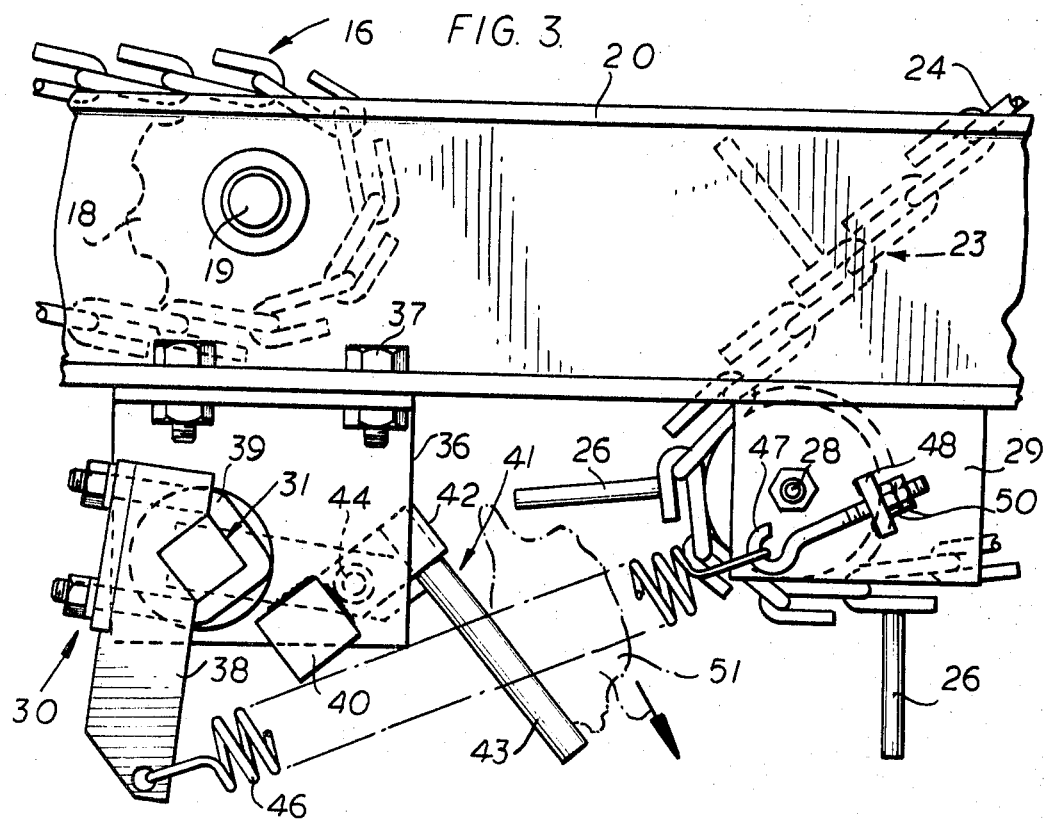
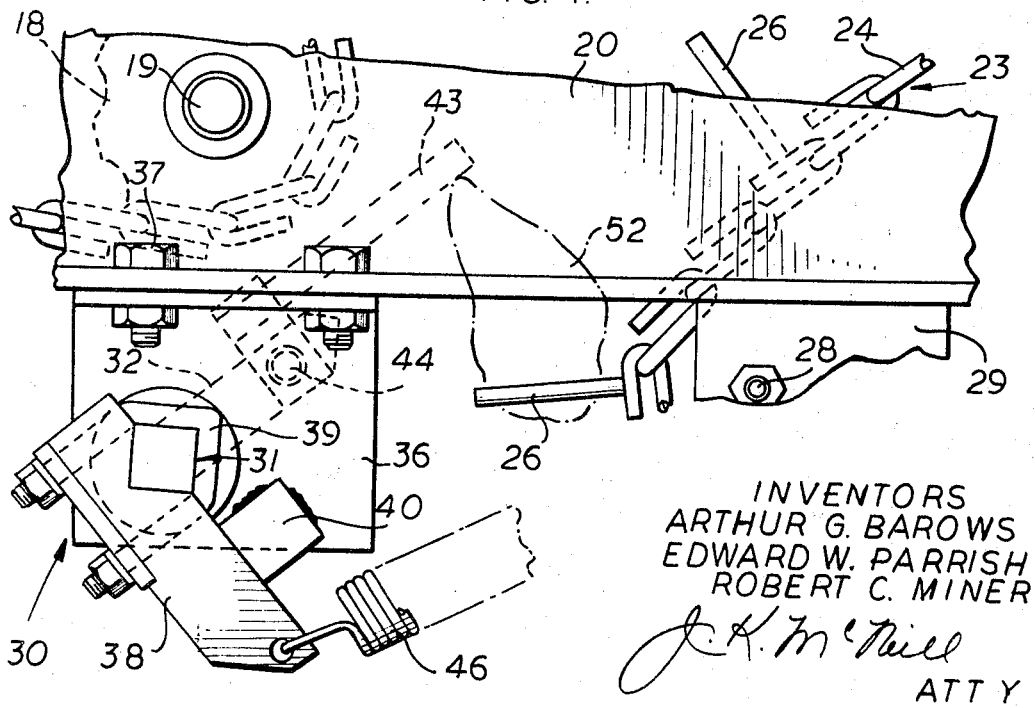

INVENTORS
ARTHUR G. BAROWS
EDWARD W. PARRISH
ROBERT C. MINER

J. K. McNeill
ATTY

United States Patent Office 3,442,380
Patented May 6, 1969

---

3,442,380
DEVICE FOR USE IN HANDLING ROOT CROPS
Arthur G. Barows, Downers Grove, Edward W. Parrish, Westmont, and Robert C. Miner, Clarendon Hills, Ill., assignors to International Harvester Company, Chicago, Ill., a corporation of Delaware
Filed Aug. 4, 1967, Ser. No. 658,402
Int. Cl. B07b *1/28;* A01d *33/04*
U.S. Cl. 209—241                                 7 Claims

ABSTRACT OF THE DISCLOSURE

In the moving of beets and the like over conveyors and the transfer therefrom to elevators having fingers adapted to pick up beets from the conveyor, to prevent beets falling through where the transfer is made with the aid of a grate having radial bars interfitting with the fingers of the elevator, the grate assembly being biased to a normal operating position but yieldable in one direction to permit rocks to fall through to the ground, the grate bars also being pivotally mounted to rock in the other direction to prevent jamming by stones picked up by the elevator teeth.

---

This invention relates to machinery for handling harvested root crops such as beets and the like, and is particularly concerned with harvesting apparatus operating in the field adapted to facilitate the elimination of rocks and other debris from the load to prepare the root crop for a marketing or refining operation.

An object of the invention is the provision of novel grate means to prevent loss of beets being transferred from a conveyor to an elevator or the like.

Another object of the invention is the provision of novel grate means between a conveyor and an elevator of a root crop treating apparatus, to assure passage of roots from the conveyor to the elevator, wherein the entire grate assembly is yieldably mounted to accommodate discharge of stones and the like to the ground before they reach the elevator, and to prevent jamming of the apparatus by stones or other obstructions picked up and carried by the elevator.

Other objects and advantages of the invention will become clear from the following detailed description when read in conjunction with the accompanying drawings, wherein:

FIGURE 2 is an enlarged detail of a portion of the beet harvester of FIGURE 1 showing the grate assembly of this invention and its relationship to the conveying and elevating apparatus, with the grate assembly parts in their normal operating position;

FIGURE 3 is a view similar to FIGURE 2 illustrating the relationship of parts when a heavy object such as a stone discharged from the end of the conveyor falls upon the grate assembly;

FIGURE 4 is a view similar to FIGURE 2 showing the position of the parts when the assembly is engaged by a stone moving upwardly with the elevator;

Figure 1:
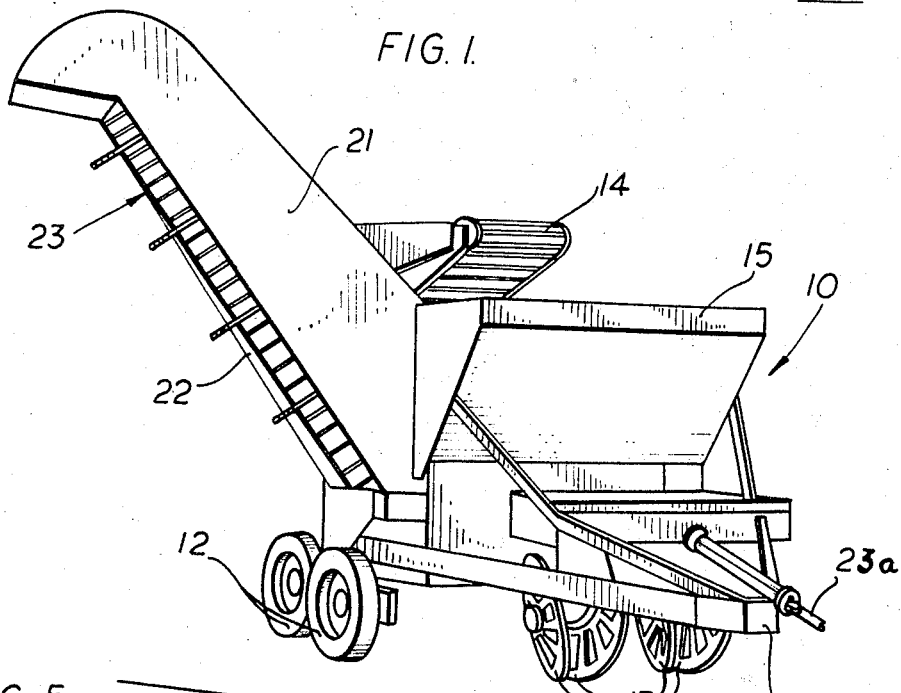
FIGURE 1 is a schematic view in perspective of a typical beet harvester incorporating the features of this invention, adapted to be drawn by a tractor.
Figure 5:
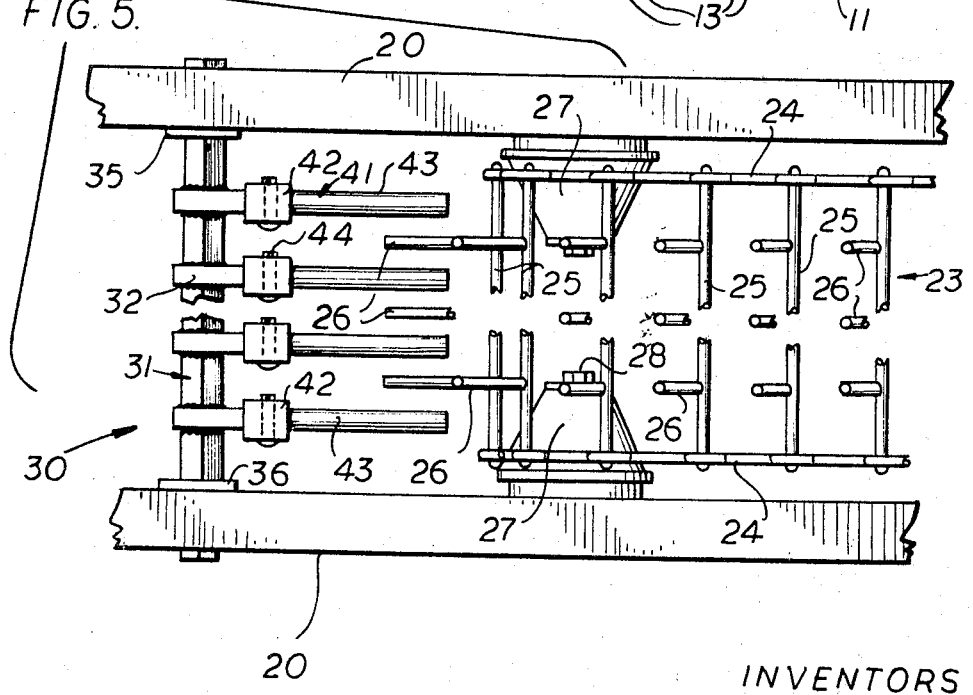
FIGURE 5 is a plan view on a smaller scale of a portion of the structure shown in FIGURE 2.
Figure 6:
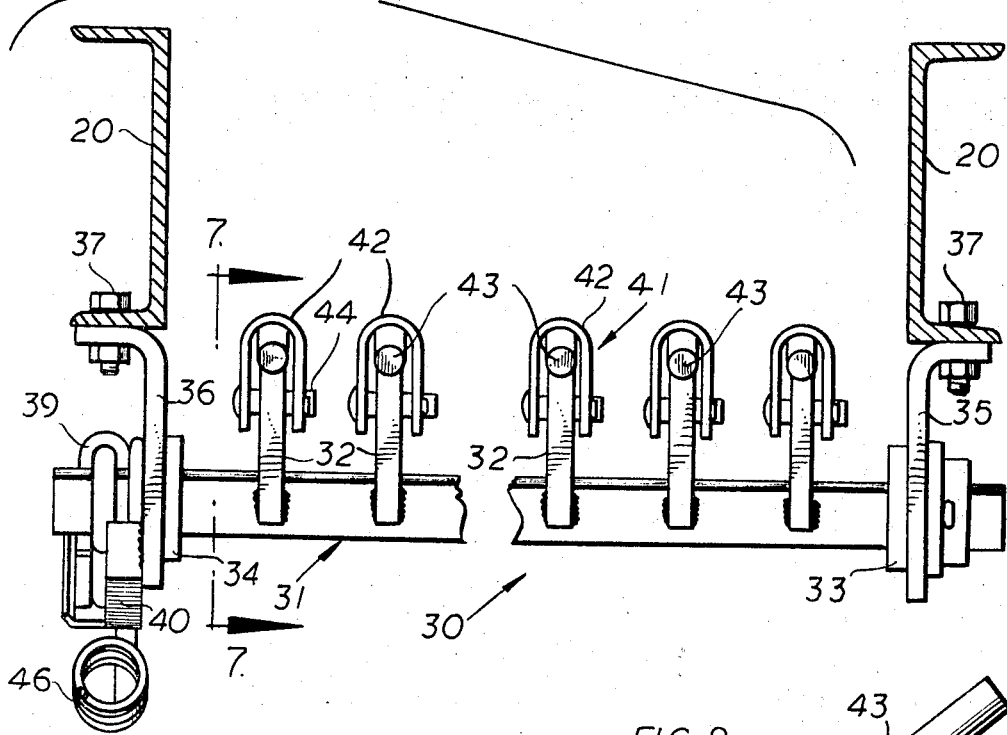
FIGURE 6 is a section taken on the line 6—6 of FIGURE 2.

The beet harvester shown diagrammatically in FIGURE 1 has a frame structure generally indicated at 10 which includes a hitch 11 for connection to a tractor, and is supported upon wheels 12. Pairs of beet digger wheels 13 are mounted on the frame structure and remove beets from the soil in a manner well known in the art, and direct them rearwardly and upwardly by means not shown to an overhead conveyor 14 from which the beeets are discharged by gravity into a container or tank 15. At least a portion of the bottom of the tank comprises a generally horizontal conveyor 16 of any well known form preferably consisting of transversely spaced endless chains 17 connected by suitable conveyor rods, not shown, and trained about sprocket wheels 18 mounted on a shaft 19 carried by channel-shaped beam members 20 forming part of the harvester frame structure 10.

Beets and debris collected in the tank 15 are carried by conveyor 16 in the direction of the arrow shown in FIGURE 2 and discharged by gravity from its end. Sidewalls 21 and 22 extending upwardly and outwardly from the tank partly enclose an elevator 23 communicating with the bottom of the tank to receive beets from conveyor 16 and unload them form the tank.

The movable elements of the harvester such as the conveyors 14 and 16 and the elevator 23 are driven in any well known manner from a drive shaft 23a adapted for connection to the power take-off shaft of the propelling tractor.

Elevator 23 is of conventional construction, comprising spaced endless chains 24 connected by transverse rods 25 having a plurality of fingers 26 affixed to and projecting outwardly therefrom. The lower ends of chains 24 are trained around pulleys 27 rotatably mounted on bolts 28 mounted in plates 29 affixed to and depending from channel members 20. Elevator 23 is driven in the direction of the arrow shown in FIGURE 2.

Beets discharged by gravity from the end of conveyor 16 are directed to elevator 23 and are engaged and conveyed upwardly by outwardly projecting fingers 26. Beets are transferred and prevented from falling through between the adjacent ends of conveyor 16 and elevator 23 to the ground by the provision of a grate assembly 30 comprising a transverse supporting member 31 having a plurality of radially projecting lugs 32 affixed thereto, as by welding, and having its ends rotatably supported in bearings 33 and 34 mounted, respectively, in depending brackets 35 and 36 affixed to the lower flanges of channel members 20 by bolts 37.

Exteriorly of bracket 36 a rockarm 38 is affixed to member 31 by a clamp 39, and in the normal operating position of the grate assembly 30 indicated in FIGURE 2, arm 38 engages a stop block 40 affixed, as by weldng, to bracket 36.

Each of the lugs 32 has mounted thereon a grate bar or rod unit 41 comprising a clevis 42 having affixed to and projecting therefrom a bar or rod 43. The clevis portion 42 of the grate bar unit straddles lug 32 and is pivotally mounted upon a pivot pin 44 carried thereby. The outer end of each of the lugs is provided with an angled portion 45, clearly shown in FIGURES 7 and 8, which engages and acts as a stop for grate bars 43 in the normal operating position thereof.

The grate assembly 30 is biased to its normal operating position shown in FIGURE 2 by the provision of a spring 46 having one end thereof anchored to the end of arm 38, and its other end to a threaded hook bolt 47 slidable in an opening provided in a lug 48 affixed to plate 29, nuts 50 being threaded on the end of the hook bolt for adjusting the tension on spring 46.

As pointed out before, FIGURE 2 shows the grate assembly parts in their normal operating position while root crops discharged from conveyor 16 are picked up and lifted by elevator 23. In this position the grate bars 43 rest against the shoulders or stops 45, holding the bars generally horizontal, and spring 46 urges arm 38 in a conuterclockwise direction against stop 40. Grate bars 43 extend generally horizontally between fingers 26 of the elevator and prevent the roots from falling through. When a heavy object such as a rock 51 is discharged from the conveyor 16, as indicated in FIGURE 3, its engagement with the grate bars revolves the entire grate assembly clockwise about the axis of support member 31 against the bias of spring 46, allowing the rock to fall through to the ground and avoiding damage to the parts of the grate assembly and elevator.

Figures 7, 8:
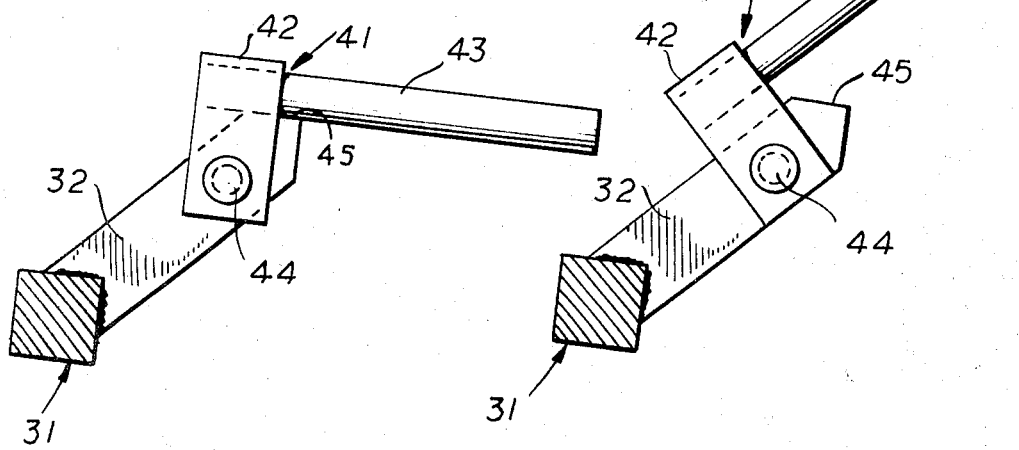
FIGURE 7 is a section taken on the line 7—7 of FIGURE 6.
FIGURE 8 is a sectional view similar to FIGURE 7 showing a different position of the pivoted grate bars.

A rock such as indicated at 52 in FIGURE 4, caught up by the fingers 26 of the elevator will not jam between the fingers of the elevator and the grate bars 43, since the latter are individually pivotable in a counterclockwise direction to the position shown in FIGURES 4 and 8, allowing the rock to pass without damaging the equipment.

Furthermore, a rock such as is indicated at 53 in FIGURE 2, tending to jam between elevator 16 and the grate assembly 30, also swings the grate assembly clockwise and allows the rock to pass through in the direction of the arrow shown in FIGURE 2.

What is claimed is:

1. In apparatus for moving root crops having a frame and including a generally horizontal conveyor having a root discharge end and an elevator having a root receiving end spaced from the discharge end of the conveyor and having outwardly projecting fingers adapted to engage and elevate roots received from the conveyor, a grate assembly mounted on the frame between the discharge end of the conveyor and the receiving end of the elevator including; a transverse support member having radially projecting grate bars extending between said fingers in the path of roots discharged from said conveyor to prevent roots from falling to the ground, means pivotally mounting said support member on the frame for rocking movement in one direction from a normal operating position, and means pivotally mounting said grate bars on said support member for rocking movement in a direction opposed to the direction of the rocking movement of said support member.

2. The invention set forth in claim 1, wherein said grate bars are individually mounted on said support member for independent rocking movement.

3. The invention set forth in claim 1, wherein said support member is mounted on the frame by means yieldably biasing it to said normal operating position.

4. The invention set forth in claim 3, wherein said support member is mounted on the frame below said conveyor in the path of roots discharged by gravity therefrom.

5. The invention set forth in claim 4, wherein an arm is secured to said support member and is connected by a spring to the frame, said spring biasing said support member to said normal operating position.

6. The invention set forth in claim 5, wherein a plurality of radially projecting lugs are affixed to said support member and said grate bars are pivotally mounted on the ends of said lugs, each of said lugs having stop means thereon engageable by said grate bars in the normal operating position thereof.

7. The invention set forth in claim 6, wherein stop means is mounted on the frame and is engageable by said arm on said support member in the normal operating position of said support member, said arm being yieldably held against said stop member by said spring.

References Cited

UNITED STATES PATENTS

| 490,924 | 1/1893 | Pomeroy | 171—110 |
| 2,198,285 | 4/1940 | Krenzer | 209—121 |
| 2,305,159 | 12/1942 | Heckman | 130—27.9 |

FOREIGN PATENTS

| 464,114 | 4/1950 | Canada. |

HARRY B. THORNTON, *Primary Examiner.*

R. HALPER, *Assistant Examiner.*

U.S. Cl. X.R.

130—27.9; 171—18; 209—395